Dec. 18, 1945.  E. P. SCHMIDT  2,391,350
BEARING CLUTCH
Filed July 28, 1943  3 Sheets-Sheet 1
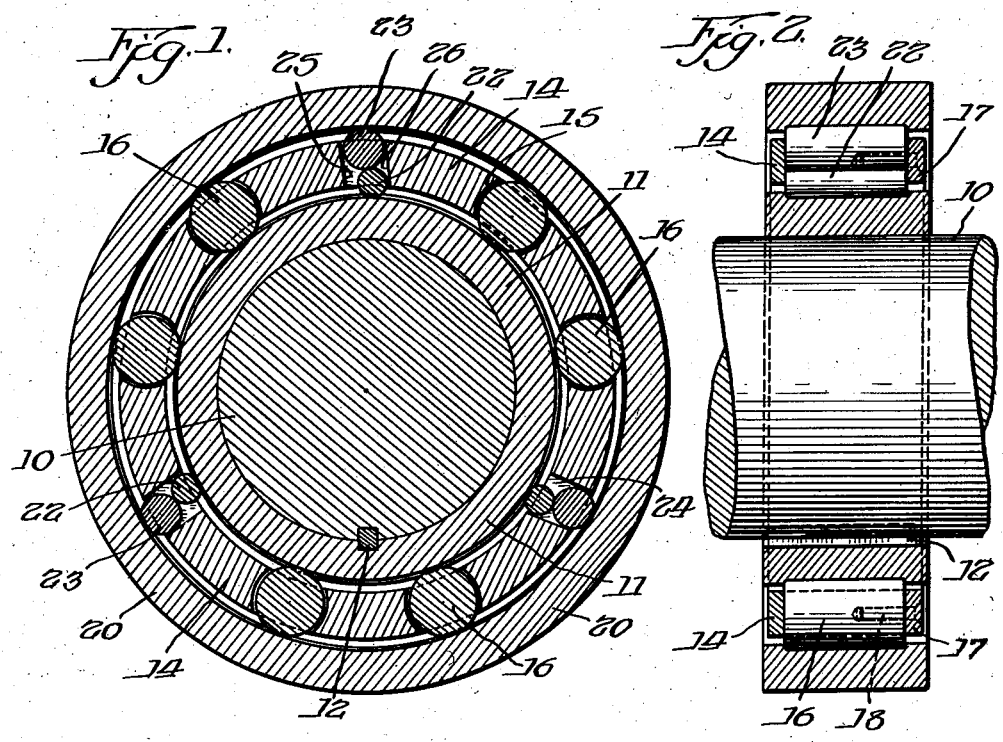
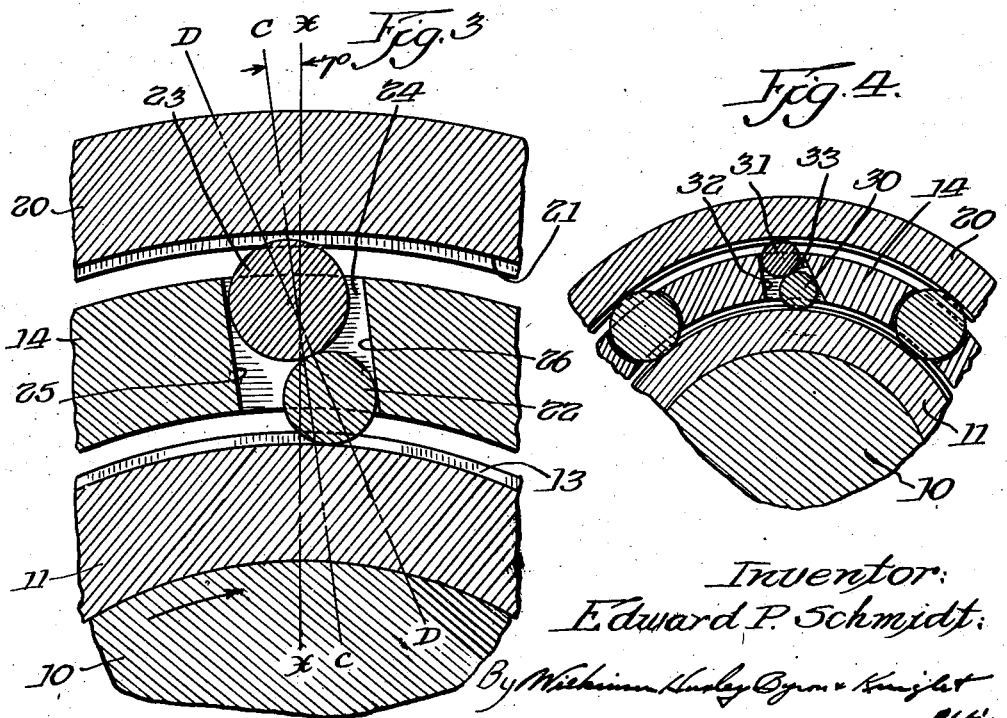
Inventor:
Edward P. Schmidt

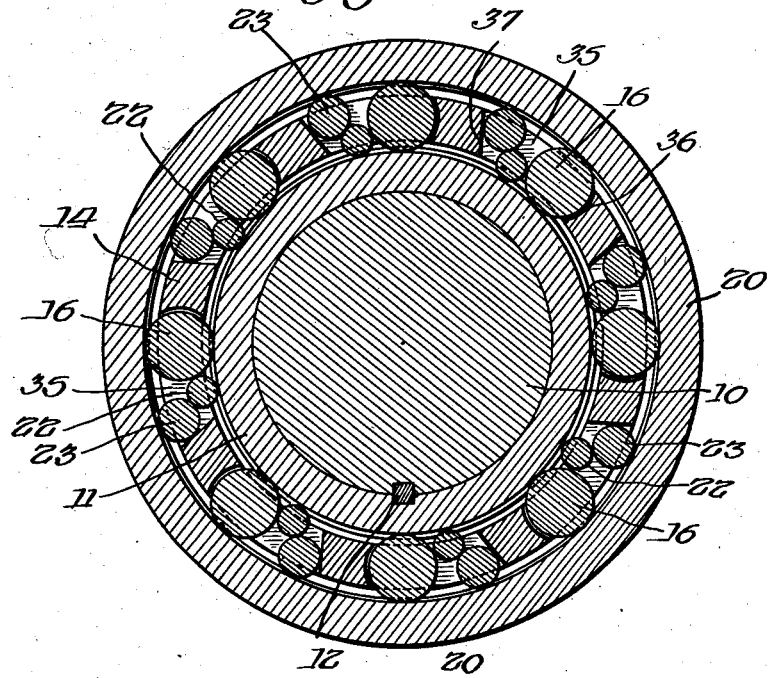
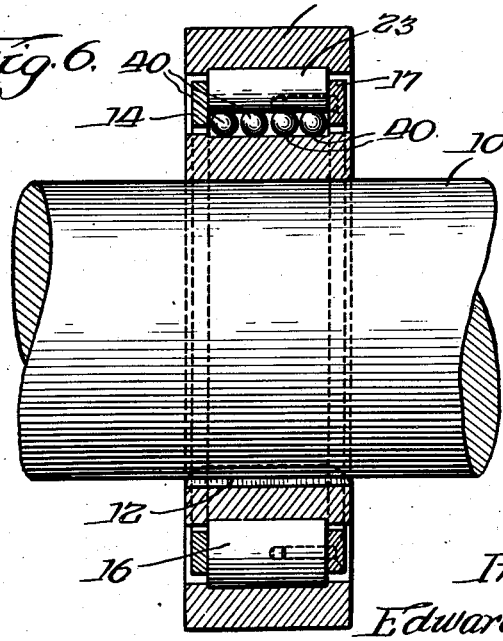

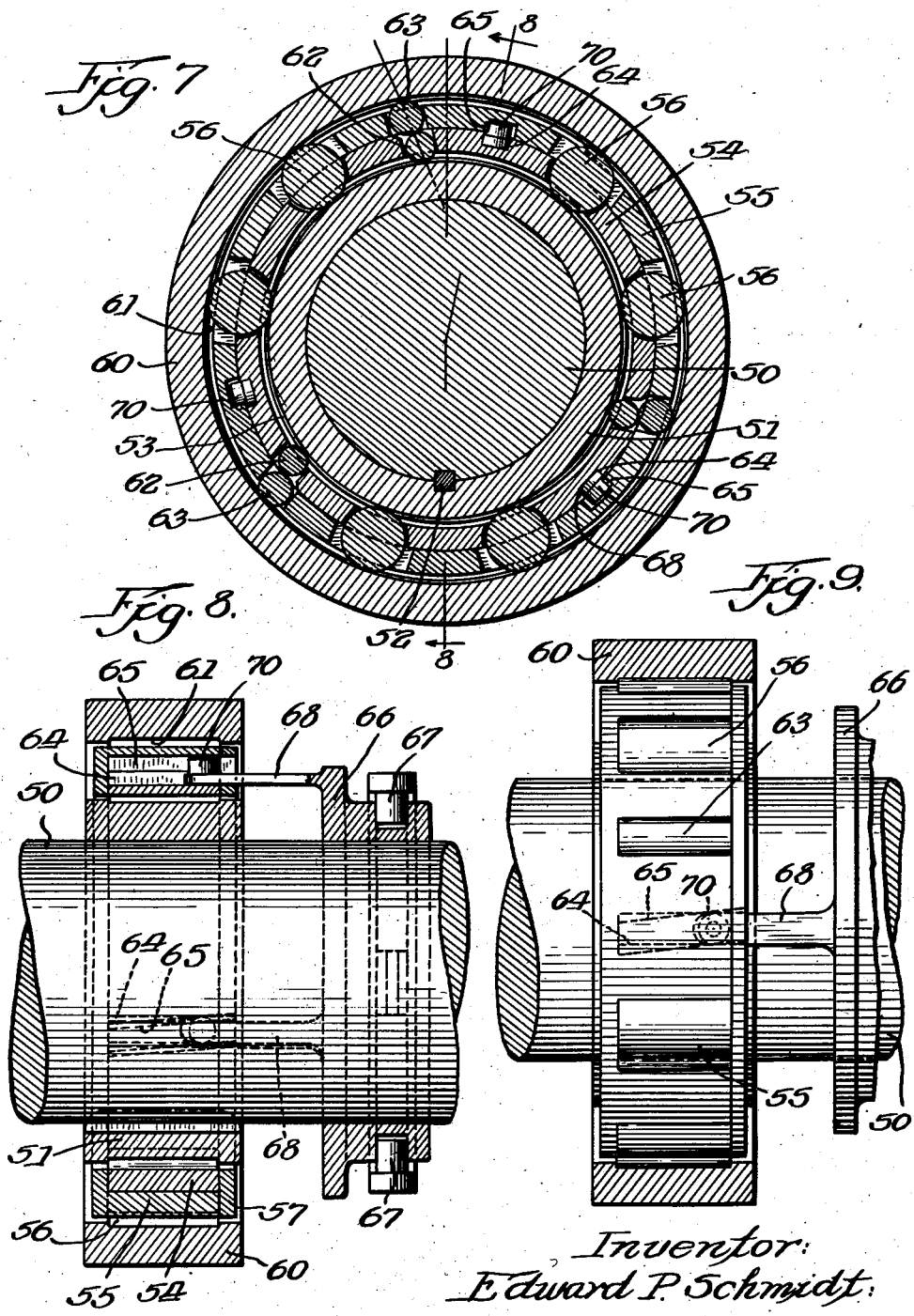

Patented Dec. 18, 1945

2,391,350

UNITED STATES PATENT OFFICE 2,391,350

BEARING CLUTCH

Edward P. Schmidt, Hollywood, Ill.

Application July 28, 1943, Serial No. 496,395

15 Claims. (Cl. 192—45)

The invention relates generally to clutches and has reference more particularly to a combination bearing and clutch of improved design and which can be constructed to form an over-running clutch or a manually actuated type of stop-and-go clutch.

An object of the invention is to provide a clutch that can be combined with a bearing member to form a combination bearing and clutch device.

Another object is to provide a clutch which will have utility as an overrunning type of clutch or as a manually actuated type and which will eliminate the use of springs as controlling means for the clutch members.

A further object of the invention is to provide a bearing clutch which will be positive in both its clutching and releasing operations and which will be simple in construction embodying relatively few parts.

Another object is to provide a bearing clutch wherein the clutching elements are carried by the bearing retainer or cage so that the combined device functions as a bearing when the clutch members are in declutched position.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a transverse sectional view through the bearing clutch of the invention illustrating one preferred arrangement of clutching elements and roller bearings;

Figure 2 is a longitudinal sectional view through the bearing clutch of Figure 1 showing both the clutch elements and bearings as comprising rollers;

Figure 3 is an enlarged sectional view showing in detail the clutching elements of Figure 1;

Figure 4 is another detail sectional view showing a modification wherein the clutch rollers have the same diameter;

Figure 5 is a transverse sectional view illustrating another preferred arrangement of clutching elements and roller bearings;

Figure 6 is a longitudinal sectional view similar to Figure 2 but illustrating a modification wherein the clutching elements comprise a roller and a plurality of balls;

Figure 7 is a transverse sectional view illustrating a construction of the stop-and-go clutch coming within the invention;

Figure 8 is a longitudinal sectional view showing the stop-and-go clutch of Figure 7 in combination with manually actuated control means therefor; and Figure 9 is a top plan view, parts being shown in section, of the combination structure of Figure 8.

The combination roller bearing and clutch device illustrated in Figures 1, 2 and 3 embodies the basic principles of the invention in an overrunning or "free wheeling" type of apparatus. The drive shaft is indicated by numeral 10, said shaft being driven in both a clockwise and counterclockwise direction by power means not shown. The collar or inner ring 11 is suitably keyed as at 12 on the shaft 10 so that the inner ring and shaft rotate together. Said inner ring 11 provides a raceway 13 extending around its outer periphery. The member for retaining the roller bearings and clutch elements comprises a cage 14 having the shape of an annulus and also having recesses 15 extending transversely for receiving the roller bearings identified by numeral 16. A plate member 17 of ring shape is secured to the cage by the screws 18 and in this manner the bearings and also the clutch elements to be presently described are held within their recess in the cage 14. An outer ring 20 extends around the cage 14, the said ring also providing a raceway 21 for the roller bearings 16. The outer ring will comprise part of a driven member adapted to receive rotary movement from the driving shaft 10. By means of the clutching elements carried by cage 14 the drive shaft 10 may rotate in a clockwise direction without imparting similar rotation to the outer ring 20. However, counterclockwise rotation of shaft 10 immediately renders the clutching elements operative to couple the inner and outer ring to form a unitary device and accordingly said counterclockwise rotation of shaft 10 is transmitted to the outer ring 20. If for any reason the speed of rotation of outer ring 20 should exceed that of drive shaft 10 the present clutching elements will permit "free wheeling" or overrunning of the said outer ring.

The clutching elements shown in Figures 1, 2 and 3 comprise pairs of rollers 22 and 23, each pair located within a passageway 24 in the cage 14 formed by the parallel walls 25 and 26. The outer roller 23 has a larger diameter than the inner roller 22. It will also be noted that each passageway formed by the parallel walls 25 and 26 is angularly disposed with respect to a radial line passing through the center of shaft 10. Each passageway forms an angle of several degrees with respect to said radial line, the angle of inclination being such that the inner opening to the passageway is toward clockwise rotation. As a result the inner rollers 22 may be described as located in advance of rollers 23 when clockwise rotation is considered. The passages for retaining the clutching elements are formed in the cage 14 transversely thereof and the plate member 17 serves to close said passages in the same manner as said plate member closes the recesses for the roller bearings 16. The inner rollers 22 have contact with raceway 13 provided by the inner ring, whereas, the outer rollers 23 will have contact with the raceway 21 provided by the outer ring. Although rollers 23 have a diameter greater than the inner rollers 22, nevertheless the diameter of both rollers is less than the width of their passageway 24 so that said rollers may have some freedom of movement within their passageway.

In Figure 3 a pair of clutching elements are shown in the position which they assume when the shaft 10 rotates in a clockwise direction. With shaft 10 rotating in this direction the inner roller 22 of small diameter will be caused to contact wall 26 of its pasageway. The upper roller 23 of larger diameter will naturally assume a position in contact with wall 25 and it will be noted that there is considerable clearance between said roller and the opposite wall 26. With the clutching rollers in this position the line joining their centers coincides with the axis D—D, which constitutes the declutched or inoperative position of the clutching rollers. Axis D—D forms an angle with the radius X—X which is greater than seven degrees. The magnitude of this angle is important since it must be large enough to permit the clutching rollers to assume a declutched position, in which case the outer roller 23 does not contact the raceway 21 of the outer ring. However, if the angle above referred to is too large the elements will not be satisfactorily moved into a clutching position when the shaft 10 is reversed to rotate in a counterclockwise direction.

When shaft 10 is rotated in a counterclockwise direction the cage 14, due to frictional contact of the roller bearings 16 with the raceway 13, will also tend to move in this direction. This action of the cage will force the inner rollers 22 under their respective outer rollers 23. The frictional contact of the rollers 22 with raceway 13 also tends to move the rollers under their outer rollers 23. A line joining the center of said rollers will thereupon substantially coincide with the axis C—C and it will be observed that the outer rollers 23 are thus caused to contact the raceway 21. This constitutes the clutching position of the rollers and the outer ring will be rotated in a counterclockwise direction since said outer ring, cage and inner ring are operatively connected by the clutching rollers to form a unitary structure. Axis C—C forms an angle of approximately seven degrees with respect to the radius X—X.

When the parts of the present clutch are operatively connected to constitute a unitary structure it will of course be understood that the rollers 16 cease to function as bearing members. However, in the declutched position the clutch elements and the roller bearing 16 fulfill the very desirable function of providing an anti-friction bearing between the inner and outer rings which is suitable for high speed operation.

With each pair of clutching rollers in an inoperative position, such as shown in Figure 3, the line joining the centers of both rollers is perpendicular to the tangent at their point of contact and said line coincides with the axis D—D. The space required for the rollers is therefore less than the distance between raceway 13 and raceway 21 and thus the outer ring is declutched from the inner ring and shaft 10. Counterclockwise rotation of the inner ring imparts sufficient movement to the cage 14 so that the cage forces the inner roller 22 under its respective roller 23, thereby forcing roller 23 into contact with raceway 21. The outer ring is thereupon clutched to the inner ring and shaft 10 and the parts rotate in a counterclockwise direction as a unit. In Figure 1 the cage 14 is shown as having six roller bearings and three pairs of clutching elements. For most constructions it has been found that this number of clutching elements gives satisfactory results. However, in the event heavy loads are to be handled by the clutch device, it is within the purview of the invention to increase the number of clutching elements. Said elements can be increased, using the same number of bearing rollers, or the bearing rollers can be reduced in order to make room for said additional clutching capacity.

In the modification of Figure 4, the clutching rollers 30 and 31 have the same diameter and the passageway retaining said rollers has diverging side walls instead of parallel side walls as described in connection with Figures 1, 2 and 3. The side walls 32 and 33 diverge in a direction toward the shaft 10 so that the opening to the passageway on the inside periphery of the cage 14 is larger than the opening on the outer periphery. Roller 30 therefore has freedom of movement as described with respect to roller 22. The passageway, as clearly shown in Figure 4, has an inclination which is in a direction toward the clockwise rotation of shaft 10. When the shaft rotates in this direction roller 30 is caused to contact the side wall 33, whereas, the outer roller 31 will naturally contact side wall 32. The rollers therefore assume a declutched position and rotation of shaft 10 in a clockwise direction therefore does not impart rotation to the outer ring 20. However, when shaft 10 is rotated in a clockwise direction the action of cage 14 is such as to force roller 30 under roller 31 and the parts are automatically clutched so that they rotate as a unit.

In the modification of Figure 5 a bearing roller and a pair of clutching elements are retained within a common passageway provided in the cage. Each passageway 35 has an arcuate wall 36 and a flat wall 37. A roller bearing 16 is located in the right end of each passageway so as to be received by the arcuate wall 16. The clutch rollers are located on the other side of each roller bearing and the outer roller 23 of large diameter is in contact with wall 37. The inner roller may be described as located between rollers 16 and 23, having sufficient freedom of movement so as to occupy either a clutched or declutched position. The roller bearing and clutch device of Figure 5 functions in a manner similar to that described in connection with Figures 1, 2 and 3. When shaft 10 rotates in a clockwise direction the cage 14 likewise rotates in this direction but at a slower speed due to the frictional engagement of the inner ring with the roller bearings 16. The rollers 22 therefore move toward their roller 16 which locates them in declutched position. When shaft 10 rotates in a counterclockwise direction, just the reverse action takes place. In other words, the cage is caused to revolve in this direction and this action forces rollers 22 under the rollers 23 to cause them to engage the outer ring 20 and thus clutch these parts so that the counterclockwise movement of shaft 10 is imparted to the outer ring.

Figure 6 is similar in all respects to Figure 2 except that the clutching elements are shown as comprising an outer roller and a plurality of balls. The outer roller is identified by numeral 23 since this roller is similar to that previously described and its action in effecting a clutching and declutching operation is also the same. However, in Figure 6 the inner roller has been replaced by a plurality of hardened steel balls identified by numeral 40. These balls have a diameter similar to the inner roller 22 and their action on the outer roller 23 is the same as described. Therefore the clutching elements, in accordance with the present invention, may comprise a pair of rollers of different diameters as is the case in Figures 1, 2 and 3, or a pair of rollers of the same diameter as shown in Figure 4. Hardened steel balls can be substituted for the inner roller in both instances and a similar substitution can be made for the inner clutching element 22 of Figure 5.

In Figures 7, 8 and 9 the basic principles of the invention are incorporated in a stop-and-go clutch which can be actuated manually by means of a collar loosely mounted on the driving shaft 50. The inner ring 51 is suitably keyed to shaft 50 as at 52 so that the ring rotates with said shaft. Said inner ring is provided with a raceway 53 on its outer periphery and a cage has surrounding relation with said raceway. The cage includes an inner annulus 54 and an outer annulus 55 having a close machined fit on the inner annulus permitting relative movement. The cage retains the bearing rollers 56 suitably held within recesses by the plate member 57 of ring shape, which is secured to the outer annulus 55 to form a channel which in turn receives the inner annulus in the manner as shown in Figure 8. The plate member 57 also holds the clutching elements within their passageways provided therefor in the cage. An outer ring 60 extends around the cage, said ring providing a raceway 61 for the roller bearings 56.

The clutching elements each comprise an inner roller 62 and an outer roller 63. Said rollers in this modification are shown as having different diameters although the invention is not restricted to this particular construction. The inner roller 62 is retained within a passageway formed in the inner annulus 54, whereas, roller 63 is retained within a passageway formed in the outer annulus 55. The passageways for the clutch rollers in this modification have a width just slightly in excess of the diameters of the rollers. It is not necessary for them to have freedom of movement within their particular passageway since relative movement between the inner and outer rollers is provided for by the fact that the cage is in two parts. The normal alignment of the clutching rollers is such that the inner roller 62 is in advance of its outer roller 63 with respect to a clockwise direction of rotation. The amount of advance determines the clutching and declutching position of the rollers.

The cage of the present stop-and-go clutch is made in two parts to provide for control of the clutch so that the same can be manually rendered operative or inoperative. This control is effected by movement of the annulus 55 with respect to annulus 54. As shown in Figures 8 and 9, the annulus 54 is provided with several longitudinal grooves 64 each extending from one side to the opposite side of the said inner annulus and which are formed in its outer periphery. The inner periphery of annulus 55 is formed with similar grooves 65 but which are angularly disposed with respect to the longitudinal axis of shaft 50. A groove 65 is located in substantial alignment with groove 64. Grooves 65 are never completely aligned with the grooves 64 since the latter are parallel to the axis of shaft 50, whereas, grooves 65 are at a slight angle. A control member in the form of a collar 66 is rotatably mounted on shaft 50, said collar being mounted on the shaft to permit free movement in an axial direction as well as rotation independently of the shaft. Axial movement of collar 66 toward or away from the stop and go clutch is effected by members 67. A plurality of fingers extend laterally from the collar and each finger has location within a groove 64. Each finger carries a roller 70 and which is located in a groove 65.

In Figures 8 and 9 the fingers 68 of the control collar are shown in withdrawn position. This constitutes the declutched position of the control means since fingers 68 and the rollers 70 carried thereby permit the two parts of the cage to assume a position wherein roller 62 of the clutching elements is advanced a considerable amount with respect to roller 63, considering shaft 50 as rotating in a clockwise direction. As previously explained, the amount of advance determines the clutching and declutching position of said elements. Therefore when the fingers 68 are moved inwardly in a direction toward the left, Figure 8, rollers 70 riding within the grooves 65 have the effect of moving annulus 55 with respect to annulus 54, said movement being in a direction to decrease the advance of roller 62. In other words, the annulus 55 is moved clockwise which decreases the advance position of rollers 62 and thus forces the elements into clutching relation with the raceways 53 and 61 on the inner and outer ring respectively. With the parts in clutched relation they rotate as a unitary structure.

In all forms of the invention the clutching elements are retained by the cage of the frictionless bearing member and said member operates in a conventional manner to reduce friction between the rotating parts when the clutching elements are in declutched relation. The present device thus constitutes a combination bearing and clutch and which may be embodied in an over-running type of apparatus or in a manually actuated type of stop-and-go clutch. The clutching elements are instantly rendered operative to clutch the inner and outer rings when the driving member is rotated in a certain direction and a major advantage of the present type of clutch resides in the elimination of springs as regards the clutching elements.

Another major improvement resides in the fact that the direction of rotation of the driving member for effecting a clutching relation can be either clockwise or counterclockwise, depending on the manner in which the cage is assembled with respect to the inner and outer rings. In the drawings the apparatus has been illustrated so that the driving member rotates counterclockwise for effecting a clutching relation. This can be reversed merely by reversing the cage. It is also possible for the inner and outer rings to be either the driving or driven member.

The efficiency of the present type of clutch depends to a certain extent on its design, particularly the design of the passageways for the clutching elements. Said design includes the particular angular relation which a passageway has with the shaft radius, the parallel or diverging relation of the walls, and their width for the particular clutch elements to be retained thereby. It has been previously explained that the angle formed by axis D—D with respect to the radius is an important matter of design and likewise the angle formed by the axis C—C is important. These factors and also the clearance required for the clutching elements, so that they have some freedom of movement, must be calculated to a high degree of accuracy in any practical design of the present type of combination bearing and clutch.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a clutch device of the character described, the combination with inner and outer concentric rings having raceways on their adjacent peripheries, one ring being adapted to be driven whereas the other ring comprises the driving member, of an anti-friction bearing located between the inner and outer rings and including a cage retaining a plurality of rolling means having rolling contact with the raceways provided by the rings, and clutching devices also retained by said cage, said clutching devices each comprising a pair of elements having rolling contact with each other and being disposed adjacent the raceways provided by the inner and outer rings, respectively.

2. In a clutch device of the character described, the combination with inner and outer concentric rings having raceways on their adjacent peripheries, one ring being adapted to be driven whereas the other ring comprises the driving member, of an anti-friction bearing located between the inner and outer rings and including a cage retaining a plurality of rolling means having rolling contact with the raceways provided by the rings, a plurality of clutching devices also retained by the cage, said clutching devices each comprising a pair of elements of less diameter than said rolling means and having rolling contact with each other when in declutched relation, one element being disposed adjacent the raceway of the inner ring and the other element being disposed adjacent the raceway of the outer ring, and said elements being adapted to engage their respective raceway for clutching purposes.

3. In a bearing clutch, in combination, concentric inner and outer rings one of which constitutes the driven and the other the driving instrumentality, the adjacent peripheries of said rings providing raceways, an anti-friction bearing located between the said rings, said bearing including a cage retaining rolling means having rolling contact with the said raceways, a plurality of clutching devices also retained by the cage in transverse angular passageways, each clutching device comprising a pair of elements having rolling contact with each other when in declutched relation, and said elements engaging the raceways provided by the inner and outer rings, respectively, when in clutching relation.

4. In a bearing clutch, in combination, a shaft having an inner ring fixed thereto, an outer concentric ring in spaced relation with respect to said inner ring, said rings providing raceways on their adjacent peripheries, an anti-friction bearing located between the said rings and including a cage retaining rolling means having rolling contact with the said raceways, said cage having a plurality of transverse angular passageways in spaced relation around the cage, a clutching device in each passageway for clutching the outer ring to the inner ring when rendered operative, whereby the said rings and bearing rotate with the shaft as a unit, and each clutching device comprising a pair of elements having rolling contact with each other when in declutched relation and being disposed adjacent the raceways provided by the inner and outer rings respectively, said elements being adapted to engage their respective raceway for clutching purposes.

5. In a bearing clutch, in combination, a shaft having an inner ring fixed thereto, an outer concentric ring in spaced relation with respect to said inner ring, said rings providing raceways on their adjacent peripheries, an anti-friction bearing located between the said rings and including a cage retaining rolling means having rolling contact with the said raceways, said cage comprising an annulus having a plurality of passageways extending from its inner periphery to its outer periphery and each being disposed at an angle with respect to a radius of said shaft, a clutching device in each passageway for clutching the outer ring to the inner ring when rendered operative, whereby the said rings and bearing rotate with the shaft as a unit, each clutching device comprising a pair of elements having rolling contact with each other when in declutched relation, one element being disposed adjacent the raceway of the inner ring and the other element being disposed adjacent the raceway of the outer ring, and said elements being adapted to engage their respective raceway for clutching purposes.

6. In a bearing clutch as defined by claim 3 wherein the rolling means retained by the cage comprise rollers, and each clutching device comprises a pair of rollers.

7. In a bearing clutch as defined by claim 4 wherein the rolling means retained by the cage comprise rollers, and each clutching device comprises a pair of rollers with the roller disposed adjacent the raceway of the outer ring having a larger diameter than the roller disposed adjacent the raceway of the inner ring.

8. In a bearing clutch as defined by claim 5 wherein the rolling means retained by the cage comprise rollers, and each clutching device comprises a pair of rollers.

9. In a bearing clutch, in combination, a shaft having an inner ring fixed thereto, an outer concentric ring in spaced relation with respect to said inner ring, said rings providing raceways on their adjacent peripheries, an anti-friction bearing located between the said rings and including a cage in the form of an annulus having reecsses retaining rolling means, said cage having a plurality of transverse annular passageways extending from its inner periphery to its outer periphery and each passageway having diverging walls in a direction toward the inner ring, a clutching device in each passageway comprising rollers of approximately the same diametrical size, said rollers having rolling contact with each other when in declutched relation, and one roller being disposed adjacent the raceway of the inner ring and the other roller being disposed adjacent the raceway of the outer ring.

10. In a bearing clutch, in combination, inner and outer concentric rings having raceways on their adjacent peripheries, a bearing member located between said rings whereby either ring may rotate with respect to the other ring with substantially frictionless rotation, said bearing member comprising a two-part cage retaining rolling means and clutching devices, an inner annulus forming one part of said cage and an outer annulus forming the second part, and said clutching devices each including a pair of elements, one element of each pair being retained by the inner annulus and the other element of each pair being retained by the outer annulus.

11. In a bearing clutch, in combination, inner and outer concentric rings having raceways on their adjacent peripheries, a bearing member located between said rings whereby either may rotate with respect to the other with substantially frictionless rotation, said bearing member comprising a two-part cage retaining rolling means and clutching device, an inner annulus forming one part of said cage and an outer annulus forming the second part and being mounted on the inner annulus such as to permit relative rotation, said clutching devices each including inner and outer elements arranged in pairs, one element of each pair being retained by the outer annulus, and the elements retained by the inner annulus having an advanced position in relation to the elements of the outer annulus with respect to a certain direction of rotation.

12. In a bearing clutch as defined by claim 11 wherein the rolling means retained by the two-part cage comprises rollers and wherein each clutching device comprises a pair of rollers adapted to have rolling contact with each other when in declutched relation with one roller disposed adjacent the raceway of the inner ring and the other roller being disposed adjacent the raceway of the outer ring.

13. In a bearing clutch as defined by claim 11 wherein means are provided for controlling the extent of the advanced position of the elements of the inner annulus in relation to the elements of the outer annulus whereby the clutching device can be rendered operative or inoperative.

14. In a bearing clutch as defined by claim 11 wherein means are provided to control relative movement of the inner and outer annuli of the cage whereby the advanced position of the elements retained by the inner annulus in relation to the elements of the outer annulus may be varied to render the clutching devices operative or inoperative.

15. In a bearing clutch, in combination, inner and outer concentric rings having raceways on their adjacent peripheries, a bearing member located between said rings whereby either may rotate with respect to the other with substantially frictionless rotation, said bearing member comprising a two-part cage retaining rollers having rolling contact with the raceways respectively, and said two-part cage also retaining clutching devices for clutching said inner and outer rings when rendered operative, an inner annulus forming one part of said cage and an outer annulus forming the second part, and said clutching devices each including a pair of rollers, one roller of each pair being retained by the inner annulus and disposed adjacent the raceway provided by the inner ring and the other roller of each pair being retained by the outer annulus and disposed adjacent the raceway provided by the outer ring.

EDWARD P. SCHMIDT.